United States Patent Office 3,397,456
Patented Aug. 20, 1968

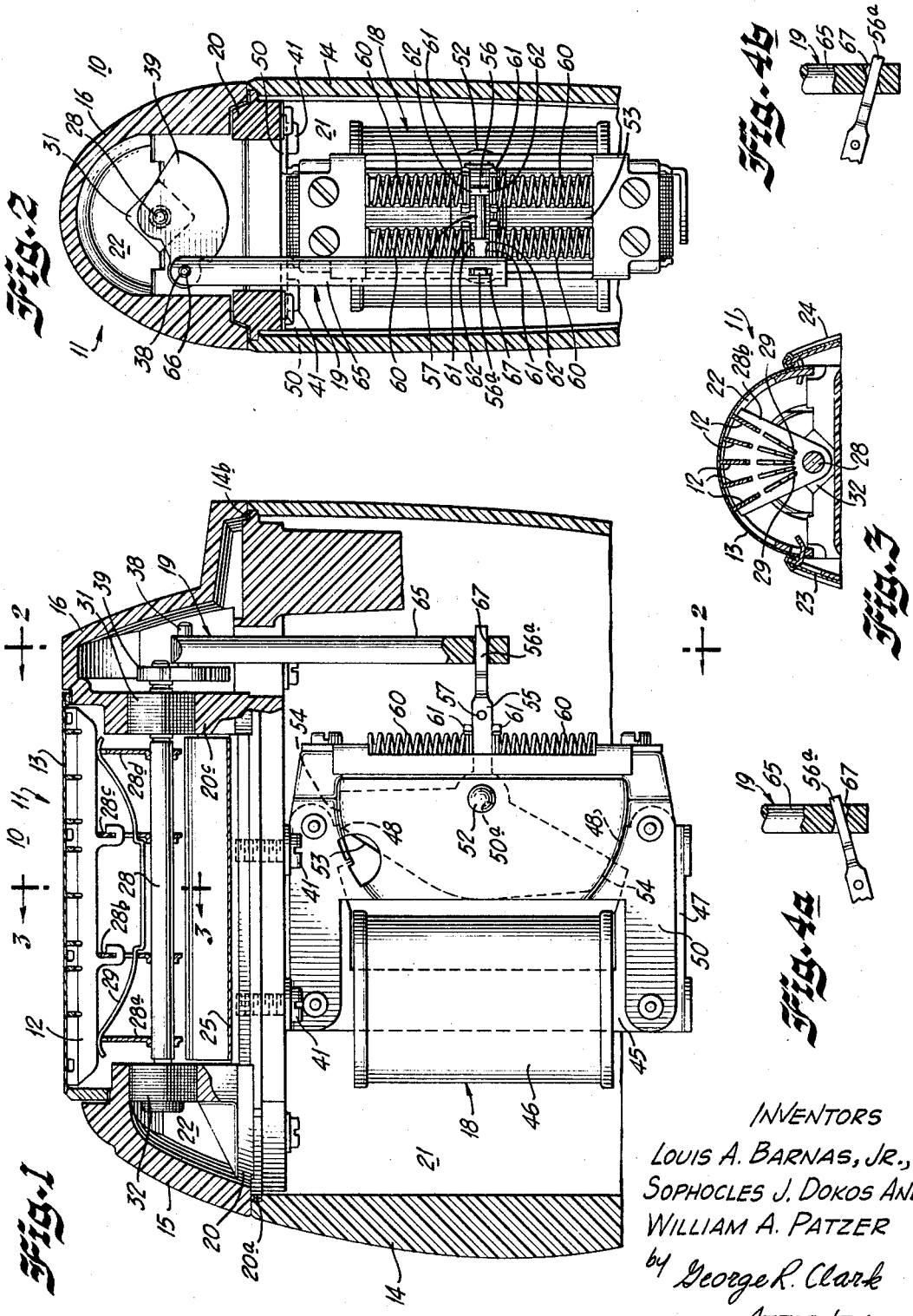

3,397,456
ELECTRIC SHAVER WITH OSCILLATING OUTPUT SHAFT DRIVEN BY RECIPROCATING MOTOR
Louis A. Barnas, Jr., Cary, and Sophocles J. Dokos and William A. Patzer, Chicago, Ill., assignors to Sunbeam Corporation, Chicago, Ill., a corporation of Illinois
Filed May 27, 1966, Ser. No. 553,554
4 Claims. (Cl. 30—43.9)

ABSTRACT OF THE DISCLOSURE

Electric shaver of the type having an oscillating shaft for actuating relatively movable cutting members wherein an electric motor having an armature which moves back and forth is employed and wherein a connecting rod interconnects the armature, which has an output movement substantially reciprocal in nature, with a crank pin eccentrically mounted relative to said oscillating shaft.

---

The present invention relates to an electric appliance, and more particularly to a new and improved electric dry shaver of the type having a vibrator driven motor and an oscillating type cutting head.

Electric dry shavers are commercially available with cutting heads of the type provided with a relatively movable comb and cutter blade. One or more cutter blades may be mounted on an oscillating shaft which is driven by suitable electric motor means. One such cutting head is described and illustrated in Jepson et al. Patent No. 3,196,539, granted July 27, 1965, and assigned to the same assignee as the present invention. Moreover, in order to maintain the cost of the shaver at a minimum, it has been suggested to use a vibrator type motor in dry shavers, particularly in dry shavers for women. Such vibrator type motors have commonly been associated with reciprocating cutters in the cutting head of the shaver. One such vibrator motor is described in Spohr Patent No. 3,218,708, granted Nov. 23, 1965, also assigned to the same assignee as the present invention. A problem arises when one attempts to transform the substantially reciprocating motion of a vibrating type motor into oscillating motion of the driven shaft of an oscillating type shaver, particularly when one maintains the parts in the most compact form to reduce the casing size to a minimum. Difficulty has heretofore been experienced in obtaining a vibratory type motor of sufficient power and stroke to operate an oscillating type shaver while maintaining the motor sufficiently small in size so that it can be incorporated into a shaver casing capable of being readily held in the hand of the user. Vibratory motors have a very short stroke if they are to produce a substantial power output.

Accordingly, it is an object of the present invention to provide a new and improved electric dry shaver of the oscillating type powered by a vibrator motor.

It is another object of the present invention to provide an improved vibrator driven oscillating type appliance.

Still another object of the present invention is to provide an improved vibrator driven oscillating type dry shaver.

It is a further object of the present invention to so orientate a vibrator type motor in an oscillating type of appliance to utilize the maximum capabilities of such a motor.

A further object of the present invention is to provide a vibrator motor type oscillating dry shaver which can utilize the comparatively short stroke of a vibrator type motor and still produce proper cutting action.

A further object of the present invention is to provide improved means for converting reciprocating motion of a power drive member in one plane to oscillating motion of a driven oscillating shaft disposed in a plane perpendicular to said one plane.

Yet a further object of the present invention is the provision of an improved vibrator type motor drive for an electric appliance.

Further objects and advantages of the present invention will become apparent as the following description proceeds and the features of novelty which characterize the invention will be pointed out with particularly in the claims annexed to and forming a part of this specification.

For a better understanding of the present invention, reference may be had to the accompanying drawing in which:

FIG. 1 is a fragmentary sectional elevational view of a dry shaver embodying the present invention;

FIG. 2 is a sectional view taken along line 2—2 of FIG. 1, assuming that FIG. 1 illustrates the entire construction;

FIG. 3 is a fragmentary sectional view taken on line 3—3 of FIG. 1, again assuming that FIG. 1 illustrates the entire construction; and FIGS. 4a and 4b are enlarged fragmentary views of a portion of FIG. 1 to illustrate extreme positions of the illustrated parts.

Briefly, the present invention is concerned with an improvement in an electric dry shaver or other electrical appliance of the type having an oscillating cutter assembly driven by a vibrating type electric motor. The cutting comprises an oscillating shaft carrying a sufficient number of cutter blades movable relative to a stationary comb to permit the use of a short angular stroke whereby the vibrator motor will have sufficient power to perform satisfactorily. The oscillating shaft is provided with a suitable crank member eccentrically mounted relative to the axis of the oscillating shaft. The vibrating motor may be of the type including an oscillating power output armature mounted on suitable shaft means and having a drive arm extending away from the shaft means so as to define a generally reciprocating power drive portion. To provide a compact and inexpensive arrangement, the axes of the armature shaft and oscillating shaft are disposed in perpendicular planes. A connecting rod interconnects the drive portion and the crank member so that the reciprocating motion of the power drive portion is converted to oscillating motion of the oscillating shaft.

Referring now to the drawing, the electric dry shaver embodying the present invention is generally designated by the reference numeral 10 and fragmentarily illustrated in FIGS. 1 and 2. Since the present invention is primarily concerned with the combination of the oscillating cutter mechanism and the power train and power supply mechanism connected therewith, only fragmentary views of the entire shaver are shown. Essentially, the shaver 10 comprises a cutting mechanism generally illustrated at 11 which may in some respects be similar to that described and claimed in the above-mentioned Jepson et al. patent. Briefly, the cutting mechanism 11 comprises a plurality of cutting blades 12 (FIGS. 1 and 3) here shown as five in number and coacting in shearing relation with a perforated comb or stationary cutting member 13. The cutting mechanism 11 including the blades 12 and comb 13 are associated with a suitable casing comprising three parts 14, 15 and 16, the comb 13 preferably comprising a substantial portion of one edge of the casing. The particular construction of the casing portions 14, 15 and 16 forms no part of the present invention but may be very similar to that disclosed in Jepson Patent No. 3,206,850, granted Sept. 21, 1965, and assigned to the same assignee as the instant application. Housed within the casing is a suitable electric motor, generally designated at 18 which, according to the present invention, is of the vibrating type and which is adapted to be connected by suitable driving means, generally designated at 19, with the cutter mechanism 11 in order to cause oscillation of this cutter mechanism at a suitable speed.

The casing for the electric shaver is of boxlike configuration so that it readily may be held in the hand of the user and no further discussion of this feature is included herein. Moreover, the casing is manufactured in three sections, as described above, in order to facilitate assembly of the electric dry shaver 10. Actually, the casing section 14, preferably molded from a suitable plastic material, is a rectangular cup-shaped member having an open top and a closed bottom (not shown). The casing sections 15 and 16 are effectively end caps which may be molded of a suitable plastic material in the same manner as the casing section 14.

In accordance with the arrangement disclosed in the above-mentioned Jepson patent, the shaver 10 includes a molded insulating support or chassis member 20 to which the cutter assembly 11 and the motor 18 are mounted in the manner described hereinafter. When the member or support 20 is associated with the shaver 10, it actually divides the shaver casing into two chambers —a motor chamber 21 disposed beneath the support 20, as viewed in FIG. 1 of the drawing, and a cutting chamber 22 disposed above the member 20. To support the member 20 and the motor and cutting mechanism from the casing, the member 20 is provided with a peripheral laterally projecting flange 20a (FIG. 1) which is adapted to engage a cooperating ledge 14b defined around the periphery of the open end of the cup-shaped casing portion 14. It will be appreciated that the subassembly comprising the support 20, to which has been secured the motor 18, as well as the cutting mechanism 11 as hereinafter described, and the end caps 15 and 16, is then associated with the cup-shaped casing member 14 by inserting the depending portion therefrom into the casing section, whereupon the latter then can be secured by suitable means to complete the assembly.

In order to retain the comb 13 in position, there is provided a pair of comb locks 23, 24 (FIG. 3) held in place to the support 20 by a suitable comb lock spring 25 (FIG. 1) as more fully described in the above-mentioned Jepson et al. patent.

Also as disclosed in the above-mentioned Jepson et al. patent, the cutter assembly 11 includes a cutter shaft 28. To resiliently support the plurality of cutter blades 12 for oscillation with the cutter shaft 28, the latter is provided with a plurality of upwardly extending supports 28a, 28b, 28c, and 28d which may be identical with those disclosed in the above-mentioned patents. These supports are of somewhat triangular shape and are rigidly secured to the cutter shaft 28. The supports are provided with suitable slots to receive the cutter blades 12 and suitable blade springs 29 are positioned therein in the same manner as disclosed in the above-mentioned Jepson et al. patent.

In accordance with the teaching of the above-mentioned Jepson patent, opposite ends of the oscillating cutter shaft 28 are bonded securely in suitable blocks of resilient material, preferably a neoprene rubber, designated at 31 and 32, and which serve as bearings to support the shaft 28. However, it is to be understood that the present invention is not limited to the type of shaft support illustrated, but is equally applicable to oscillating cutter shafts mounted as shown in the aforesaid Jepson et al. patent. The blocks 31 and 32 are held in position in the manner described in the above-mentioned Jepson patent.

In order to oscillate the shaft 28, it includes a combined crank and counterweight comprising a crank pin 38 and a counterweight 39 secured to the driven end of the oscillating shaft 28. It is understood that the crank pin 38 is eccentrically mounted relative to the axis of shaft 28 so that bodily movement of the crank pin 38 will result in oscillating movement of the cutter shaft 28.

As explained above, the motor 18 is enclosed within the casing 14, and to this end is secured to the lower side of the support 20 in any suitable manner as by a plurality of cap screws 41. The motor 18 is of the vibrating type having an oscillating armature, and may be of the type described in the above-mentioned Spohr patent. Briefly, however, the motor 18 includes a generally U-shaped laminated field 45 having a coil 46 mounted on the bight portion thereof and having outwardly extending legs 47 formed with opposed pole faces 48. Suitably assembled to the outer faces of the laminated field 45 are a pair of frame members 50. Each of the frame members 50 is provided with a more or less centrally located aperture 50a which serves to support one end of an armature shaft 52. The armature shaft 52 supports a laminated armature 53. The armature 53 has two salient poles 54 which are positioned apart the same angular distance as the field pole faces 48. The faces of the armature poles 54 are cylindrically curved about the axis on which the armature is pivotally mounted. Clamped within the stack of armature laminations is a pair of substantially T-shaped members 55, the leg of the T portions forming arms 56 which are tied together with a suitable tie member 57. One of the arms 56 is provided with an extension 56a which defines an output drive arm.

The output drive arm 56a and the associated armature 53 are held in the neutral or home position shown in FIGS. 1 and 2 of the drawing by a plurality of springs 60 described in more detail hereinafter. In this position the drive arm 56a extends from the armature 53 along a line generally parallel with the axis of shaft 28. Upon energization of the field coil 46 the armature 53 will oscillate about the axis of its shaft 52 and the output drive arm 56a will reciprocate in a vertical plane as viewed in FIG. 1 of the drawing.

As is conventional in vibrator type motors, a tuned spring system is provided to oscillate the armature between pulses by the field. In the instant case the spring system takes the form of two pairs of helical springs 60 mentioned above which are mounted to engage the arms 56 a short distance from the pivotal mounting on the armature shaft 52. For the purpose of supporting the inner ends of the springs 60, spring supporting cups 61 are secured to the arms 56 by means of projections 62 which extend into the supporting cups 61 and are staked over therein. For supporting the outer ends of the springs 60, the frame members 50 are provided at their upper ends with inwardly extending projections 50b to which are secured suitable spring supports.

To energize the motor 18, it is understood that suitable leads and terminal pins are provided so that the field coil 46 may be energized from a suitable power source.

To transform the reciprocating movement of output drive arm 56a to oscillating motion of the cutter shaft 28, the driving means 19 includes a suitable connecting rod 65 interconnecting crank pin 38 and drive arm 56a. Connecting rod 65 is provided with a first aperture 66 adjacent its top for receiving the crank pin 38 therein. Connecting rod 65 is also provided with a second aperture at its lower end in the form of a longitudinal slot 67, best illustrated in FIGS. 2, 4a and 4b, for receiving therein the drive arm 56a. Since the angular relation of the drive arm 56a will vary slightly relative to the longitudinal axis of connecting rod 65, the longitudinal slot 67 receiving the drive arm 56a is provided with curved convex edges such that the edges of the drive arm 56a have an equal tangential clearance with the edges of the slot throughout the variations in the angular relationship of the connecting rod 65 with the drive arm 56a as the oscillating armature 53 passes through its cycle of oscillation. The extreme positions of the drive arm 56a and the relationship with the connecting rod 65 are shown in FIGS. 4a and 4b.

The comparatively short stroke with any kind of power output inherent in a vibrator type motor is readily utilized by employing a substantial number of blades 12 thereby providing satisfactory cutting with movement of the blades through a short arc. In accordance with one embodiment, five blades were found satisfactory, although three or more blades should perform satisfactorily. A lesser number of blades may be unsatisfactory because of the limitation in power output with increase in stroke length inherent in a vibrator type motor.

It will be seen that the shaver according to the present invention converts the vibrating motion of an oscillating motor to the oscillating motion required by the oscillating cutting head. The arrangement is such that the shaft of the motor armature and the oscillating shaft of the cutter head are spaced apart and at right angles to each other so that the drive arm 56a of the vibrating motor moves in substantially a reciprocating motion toward and away from the oscillating shaft 28. A single rod converts the reciprocating motion of the output drive arm 56a to oscillating motion of the oscillating shaft 28. The present orientation of the vibrator motor to the oscillating cutter shaft was found to consume a minimum of power having only two pivotal connections between the motor drive shaft 56a and the oscillating shaft 28. Accordingly, the motor may be made small enough to be conveniently held in the hand. Moreover, the present motor orientation minimizes the effects of motor vibration to the user by virtue of the fact that the mass center of the system is located about at the position where the users grasp the housing with their fingers. Thus there is provided an inexpensive and very compact motor and drive structure for an electric dry shaver which develops and transmits adequate power through a short but effective stroke to operate the cutting head.

Although the present invention has been described by reference to only a single embodiment thereof, it will be apparent that numerous other modifications and embodiments may be devised by those skilled in the art and it is intended by the appended claims to cover all such modifications and embodiments which fall within the true spirit and scope of the present invention.

What is claimed as new and desired to be secured by Letters Patent of the United States is:

1. An electric shaver having relatively movable cutting members comprising power means including an oscillating power output member mounted on shaft means having drive arm means extending away from said shaft means defining a generally reciprocating power drive member, driven means including an oscillating shaft and a crank member mounted to said oscillating shaft, and a connecting rod interconnecting said drive member and said crank member so that reciprocating motion of said power drive member is converted to oscillating motion of said oscillating shaft, said oscillating shaft causing relative movement of said cutting members.

2. An electric shaver as set forth in claim 1 wherein said shaft means and said oscillating shaft are spaced apart and at right angles to each other.

3. An electric shaver as set forth in claim 1 wherein said connecting rod is provided with a longitudinal slot receiving said drive member having curved convex edges such that the edges of said drive member have an equal tangential clearance with the edges of said slot throughout variations in the angular relationship of said connecting rod with said drive member as said oscillating power output member passes through its cycle of oscillation.

4. A dry shaver comprising a casing, a cutter head mounted on said casing including an oscillating shaft and a crank pin eccentrically mounted relative to said oscillating shaft and drivingly connected thereto, an electric motor mounted within said casing having an armature which moves back and forth, a generally reciprocating power drive member connected to said armature and movable toward and away from said oscillating shaft, and connecting rod means interconnecting said crank pin and said power drive member so that reciprocating motion of said power drive member is converted to oscillating motion of said oscillating shaft.

References Cited

UNITED STATES PATENTS

| | | | |
|---|---|---|---|
| 586,563 | 7/1897 | Parsons | 19—161 |
| 2,661,012 | 12/1953 | Militano | 74—96 X |
| 2,685,222 | 8/1954 | Hart | 74—96 X |
| 2,688,184 | 9/1954 | Jepson | 30—43.9 |
| 2,828,539 | 4/1958 | Winther | 30—43.9 |
| 2,895,158 | 7/1959 | Riester | 74—96 X |
| 3,006,198 | 10/1961 | Cohen et al. | 74—96 X |
| 3,013,437 | 12/1961 | Harding | 74—96 |
| 3,153,802 | 10/1964 | Howard | 15—250.27 |
| 3,196,539 | 7/1965 | Jepson et al. | 30—43.9 |
| 3,244,916 | 4/1966 | Jepson | 30—43.9 |
| 3,311,763 | 3/1967 | Jepson et al. | 30—43.9 X |

MYRON C. KRUSE, *Primary Examiner.*